United States Patent
Kim et al.

(10) Patent No.: US 10,297,406 B2
(45) Date of Patent: May 21, 2019

(54) SYSTEM AND METHOD FOR CONTROLLING POWER OF HIGH SPEED VEHICLE

(71) Applicants: HYUNDAI MOTOR COMPANY, Seoul (KR); KIA MOTORS CORPORATION, Seoul (KR); YURA CORPORATION CO., LTD., Seongnam-si, Gyeonggi-do (KR)

(72) Inventors: Hyun Wook Kim, Seoul (KR); Young Jong Lee, Seoul (KR); Hae Yun Kwon, Bucheon-si (KR); Jin Kim, Suwon-si (KR); Sang Jae Han, Hwaseong-si (KR); Chan Young Jung, Seongnam-si (KR)

(73) Assignees: Hyundai Motor Company, Seoul (KR); Kia Motors Corporation, Seoul (KR); Yura Corporation Co., Ltd., Seongnam-si (KR)

( * ) Notice: Subject to any disclaimer, the term of this patent is extended or adjusted under 35 U.S.C. 154(b) by 0 days.

(21) Appl. No.: 15/297,778

(22) Filed: Oct. 19, 2016

(65) Prior Publication Data
US 2018/0005789 A1   Jan. 4, 2018

(30) Foreign Application Priority Data
Jul. 1, 2016  (KR) .......................... 10-2016-0083651

(51) Int. Cl.
*H01H 47/22* (2006.01)
*B60R 16/033* (2006.01)
*B60R 16/03* (2006.01)

(52) U.S. Cl.
CPC ............. *H01H 47/22* (2013.01); *B60R 16/03* (2013.01); *B60R 16/033* (2013.01)

(58) Field of Classification Search
CPC ........ B60R 16/03; B60R 16/033; H01H 47/22
See application file for complete search history.

(56) References Cited

U.S. PATENT DOCUMENTS

| | | | |
|---|---|---|---|
| 3,931,550 A | 1/1976 | Dalpee | |
| 7,096,104 B2 * | 8/2006 | Stangl | .................... B60J 7/0573 307/10.1 |
| 2006/0238299 A1 * | 10/2006 | Downey | ............... B60R 25/045 340/5.72 |
| 2015/0236501 A1 | 8/2015 | Lee | |

FOREIGN PATENT DOCUMENTS

| | | |
|---|---|---|
| JP | 2005-014733 A | 1/2005 |
| JP | 5085912 | 11/2012 |
| JP | 2014-24389 A | 2/2014 |
| JP | 5957344 B2 | 7/2016 |
| KR | 10-2011-0051661 A | 5/2011 |
| KR | 10-1535011 | 7/2015 |

* cited by examiner

*Primary Examiner* — Rexford N Barnie
*Assistant Examiner* — Terrence R Willoughby
(74) *Attorney, Agent, or Firm* — Brinks Gilson & Lione

(57) ABSTRACT

There are provided a system and a method for controlling power of a high speed vehicle. The system for controlling power of a vehicle includes: a latch relay configured to supply power to a vehicle load or to block power to the vehicle; a communication part configured to output a driving signal when a wakeup signal is received; a pulse generator configured to output a one shot pulse that turns on the latch relay when the driving signal is applied; and a processor configured to control a driving of the latch relay turned on by the one shot pulse when being initialized.

10 Claims, 2 Drawing Sheets

SYSTEM AND METHOD FOR CONTROLLING POWER OF HIGH SPEED VEHICLE

CROSS-REFERENCE TO RELATED APPLICATION

This application is based on and claims the benefit of priority to Korean Patent Application No. 10-2016-0083651, filed on Jul. 1, 2016 in the Korean Intellectual Property Office, the entire disclosure of which is hereby incorporated by reference.

TECHNICAL FIELD

The present disclosure relates to a technology of controlling power of a vehicle using a latch relay, and more particularly, to a system and a method for controlling power of a high speed vehicle capable of driving a latch relay that blocks a dark current with hardware.

BACKGROUND

In general, a dark current blocking system is applied to a vehicle to block supply power to a controller by a relay.

However, since an ordinary relay continuously applies power to a coil to be turned on, it has a high current consumption. Therefore, a latch relay having small consumption of power which is turned on/off due to a transient supply of a pulse has recently been used.

However, since the latch relay in a system for controlling power according to the related art is controlled by a processor, it was impossible to block load power or release the blocking of the load power when the processor is not driven (e.g., before an initialization, and at the time of an occurrence of processor error or fail).

In addition, since the system for controlling power according to the related art may not open a door until a booting of the processor after power of a door control module is blocked, it had a problem that the door is opened after an SMK is pushed two to three times.

As well, the latch relay has an energization time of the coil from at least 20 ms to at most 1 minute on characteristics thereof, and when the coil is energized for a time exceeding at most 1 minute, there is a concern that the latch relay is damaged and burned out, which was not prepared.

SUMMARY

The present disclosure has been made to address the above-mentioned problems occurring in the prior art while advantages achieved by the prior art are maintained intact.

An aspect of the present disclosure provides systems and methods for controlling power of a high speed vehicle capable of releasing a power blocking of a latch relay before an initialization of a processor.

Objects of the present disclosure are not limited to the objects described above, and other objects that are not described above may be clearly understood by those skilled in the art from the following description.

In an exemplary form of the present disclosure, a system for controlling power of a vehicle includes: a latch relay configured to supply power to a vehicle load or to block power to the vehicle load; a communication part configured to output a driving signal when a wakeup signal is received; a pulse generator configured to output a one shot pulse that turns on the latch relay, when the driving signal is applied; and a processor configured to control a driving of the latch relay turned on by the one shot pulse when being initialized.

In another exemplary form of the present disclosure, a method for controlling power of a vehicle by a latch relay that supplies the power to a vehicle load or blocks the power to the vehicle load includes: outputting, by a pulse generator, a one shot pulse that turns ion the latch relay in response to a wakeup signal; and when a processor is initialized, controlling a turning on or a turning off of the latch relay turned on by the one shot pulse depending on whether or not a preset power supply condition is satisfied.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The above-mentioned objects, and other objects, advantages and features of the present disclosure, and methods to achieve them will become apparent from exemplary forms described below in detail with reference to the accompanying drawings. However, the present disclosure is not limited to the exemplary forms disclosed below, but will be implemented in various forms. The exemplary forms are merely provided so that the present disclosure is thorough and the scope of the present disclosure is fully provided to those skilled in the art. Therefore, the present disclosure will be defined by the scope of the appended claims. Meanwhile, terms used in the present specification are for explaining the exemplary forms rather than limiting the present disclosure. Unless explicitly described to the contrary, a singular form includes a plural form in the present specification. The word "comprises" and/or "comprising" used in the present specification will be understood to imply the inclusion of stated component, steps, operations and/or elements but not the exclusion of one or more other components, steps, operations and/or elements.

Figure 1:
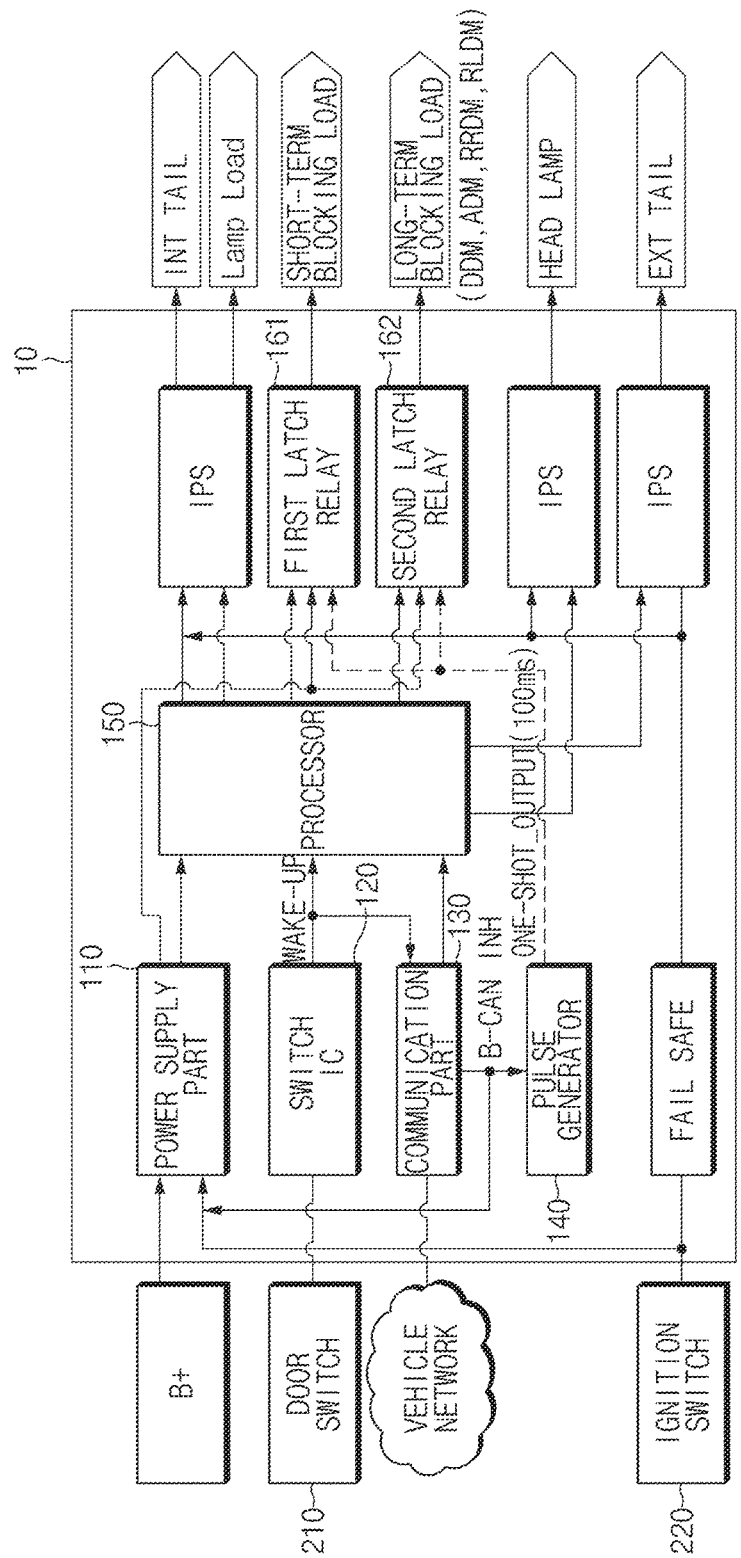
FIG. 1 is a configuration diagram illustrating a system for controlling power of a vehicle.

Hereinafter, exemplary forms of the present disclosure will be described in detail with reference to the accompanying drawings. FIG. 1 is a configuration diagram illustrating a system for controlling power of a vehicle.

As illustrated in FIG. 1, the system 10 for controlling power of a vehicle includes a power supply part 110, a switch integrated circuit (IC) 120, a communication part 130, a pulse generator 140, one or more latch relays 161 and 162, and a processor 150.

The system 10 for controlling power of a vehicle may be included in a smart junction box, an integrated gateway & power control module (IGPM), an integrated central control unit (ICU), or a component capable of performing the same function as or similar to those described above. Here, the IGPM is a component including a smart junction block and a gateway, and the ICU is a component including some functions of the IGPM and a BCM.

Hereinafter, the respective components of the system 10 for controlling power of a vehicle will be described.

The power supply part 110 converts a level of a battery power supply B+ upon turning on an ignition switch 220, and generates driving power of the processor 150. In this case, the driving power may be the driving power of other components of the system 10 for controlling power of a vehicle, for example, the switch IC (120), the communication part 130, and the pulse generator 140.

For example, the power supply part 110 may be a power conversion IC such as a regulator, or the like.

The one or more latch relays 161 and 162 are switches that block the battery power supplied to a vehicle load in order to block a dark current of the vehicle load. The above-mentioned latch relays 161 and 162 supply power to the vehicle load (a short-term blocking load and a long-term blocking load) in a turned-on state, and block the power supplied to the vehicle load in a turned-off state.

The one or more latch relays 161 and 162 may be typically classified into a first latch relay 161 for the short-term blocking load which blocks the power in the short term, and a second latch relay 162 for the long-term blocking load which blocks the power in the long term. In the following specification, the case in which the one or more latch relays 161 and 162 are the first and second latch relays 161 and 162 will be described by way of example.

Here, the long-term blocking load may be a driver seat door module (DDM), an assistant seat door module (ADM), a rear right door module (RRDM), a rear left door module (RLDM), or the like.

When the switch IC 120 senses a manual operation of a door switch 210 of a driver, the switch IC 120 outputs a wakeup signal. In this case, the wakeup signal may be a digital signal of active low or active high.

When the communication part 130 receives a wakeup signal (CAN signal) from a smart key system through a vehicle network, or receives the wakeup signal from the switch IC 120, the communication part 130 outputs a driving signal (B-CAN INH). For example, the communication part 130 may be a B-CAN transceiver that supports CAN communication of the vehicle.

When the pulse generator 140 is applied with the driving signal, the pulse generator 140 outputs one shot pulse that turns on the latch relays 161 and 162.

Here, one shot pulse may be an active high (or low) pulse having a critical length (100 ms) that turns on the latch relays 161 and 162. In this case, the critical length may be a pulse which is more than a minimum value and less than a maximum value of an energization time of a coil for turning on the latch relays 161 and 162.

For example, the pulse generator 140 is configured by one shot trigger circuit, and the above-mentioned one shot trigger circuit may be configured in various forms which are known.

When the processor 150 is initialized, the processor 150 controls the driving of the latch relays 161 and 162 which are turned on by the one shot pulse before the initialization. In this case, when the processor 150 receives the wakeup signal from the switch IC 120 or the operation signal (B-CAN INH) from the communication part 130, the processor 150 may be initialized.

Specifically, after the initialization of the processor 150, the processor 150 confirms that a preset power supply condition is satisfied, and if the power supply condition is satisfied, the processor 150 maintains a turned-on state of the latch relays 161 and 162. On the other hand, as a result of the confirmation, if the power supply condition is not satisfied, the processor 150 may turn-off the latch relays 161 and 162. Here, if the processor 150 confirms an input of the wakeup signal, the processor 150 may determine that the power supply condition is satisfied.

In this case, a signal output pin that controls each of the latch relays 161 and 162 of the processor 150 may be externally pulled-up or pulled-down so that the first and second latch relays 161 and 162 are unintentionally turned-on or off due to noise occurring in a unstable state of the processor 150.

The processor 150 may perform a control to turn-off the first and second latch relays 161 and 162 in order to block the dark current when the vehicle is parked for a long time in a state in which the ignition switch 220 is turned-off.

For example, the processor 150 may be a microprocessor, a central processing unit (CPU), a micom, and the like, and may include at least one memory.

Meanwhile, the exemplary form described above has described a system for controlling power of a vehicle in which the pulse generator 140 supplies a one shot pulse to the first and second relays 161 and 162 by way of example. However, unlike this, the system 10 for controlling power of a vehicle may also be configured in a form in which the pulse generator 140 supplies a one shot pulse to only one of the first and second relays 161 and 162.

As such, in exemplary forms, the power may be supplied to the vehicle door module by a hardware circuit before the initialization of the processor 150. Therefore, the problem according to the related art in which an SMK door is opened by continuously operating the SMK two to three times at the time of opening the SMK door after the blocking of the vehicle door module may be solved.

In addition, in exemplary forms of the present disclosure, since the process does not control the latch relays in a fail state of the processor, or the like, a damage and burn-out problem caused by exceeding the energization time of the coil of the latch relay may be prevented.

Further, in exemplary forms of the present disclosure, the power blocking for the vehicle door module may be released even when the processor is not driven (a failsafe situation) depending on an error occurrence of the processor.

Figure 2:
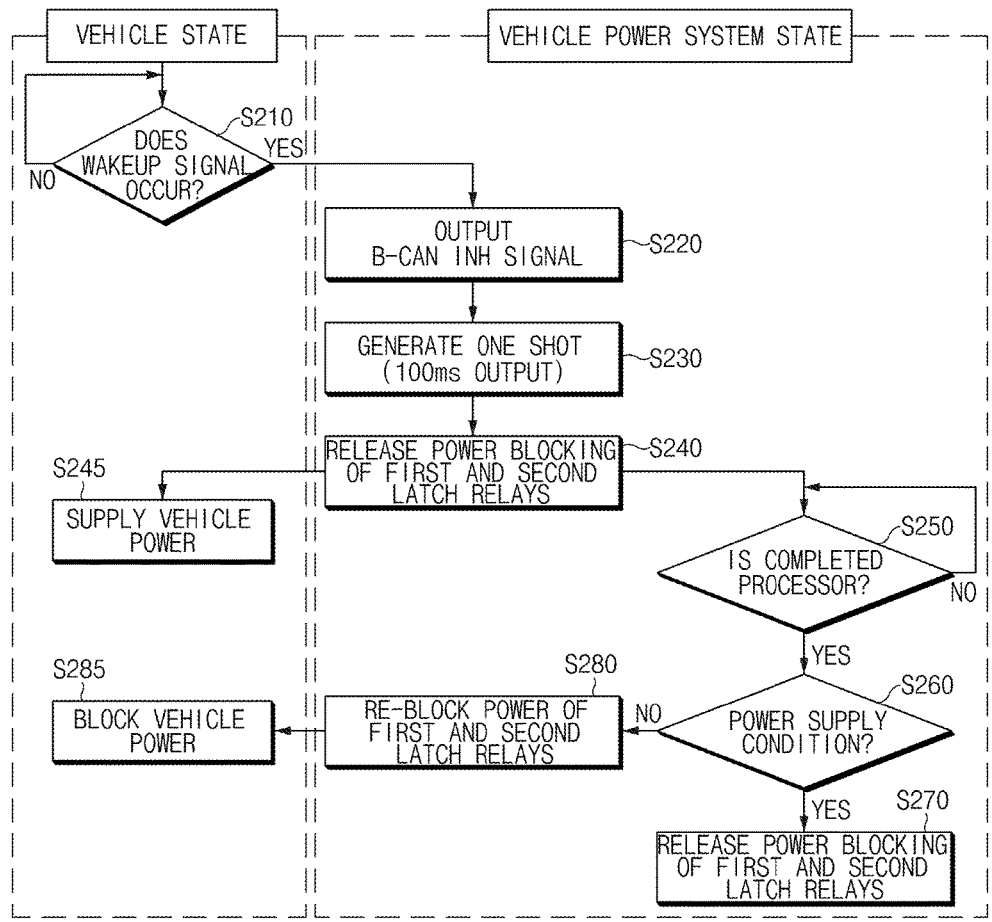
FIG. 2 is a flow chart illustrating a method for controlling power of a vehicle.

Hereinafter, an exemplary method for controlling power of a vehicle will be described with reference to FIG. 2. FIG. 2 is a flow chart illustrating a method for controlling power of a vehicle.

Referring to FIG. 2, when the communication part 130 is applied with a wakeup signal (Yes in S210), the communication part 130 outputs a driving signal (S220).

In this case, the wakeup signal may be output from the switch IC 120 that senses a manual operation of the door switch 210 of a user who wants to open the vehicle door. Alternatively, the wakeup signal (CAN signal) may be transferred from an SMK system that senses a door opening button operation of an FOB through a vehicle network.

When the pulse generator 140 is applied with a driving signal, the pulse generator 140 outputs a one shot pulse of 100 ms (S230).

Then, the first and second latch relays 161 and 162 are turned on, and release a power blocking of a blocked load (S240). That is, the first and second latch relays 161 and 162 are turned on by one shot pulse, and supply battery power to long-term and short-term blocking loads (S245).

When an initialization of the processor 150 is completed (Yes in S250), the processor 150 confirms whether or not a power supply condition is satisfied (3260). Here, when the process 150 confirms an application of the wakeup signal, the processor 150 may determine that the power supply condition is satisfied.

When the power supply condition is satisfied, the processor 150 maintains the release of the power blocking of the first and second latch relays 161 and 162 (S270).

When the power supply condition is not satisfied, the processor 150 turns-off the first and second latch relays 161 and 162 and re-blocks output power thereof (S280). Then, the battery power is not supplied to the long-term and short-term blocking loads (S285).

As such, in exemplary forms of the present disclosure, since the power is supplied to the vehicle door module by driving the latch relays by the hardware circuit before the initialization of the processor, a speed of an open control the SMK door may be improved while the dark current is efficiently blocked.

In addition, in exemplary forms of the present disclosure, since the processor does not control the latch relays in the fail state of the processor, or the like, the damage and burn-out problem caused by the exceed of the energization time of the coil of the latch relay may be prevented.

As described above, in exemplary forms of the present disclosure, blocking characteristics of the dark current of the vehicle and an opening speed of the vehicle door may be improved.

Further, in forms of the present disclosure, when a processor error (or failure) occurs, it is possible to perform fail safety.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for controlling power of a vehicle, the system comprising:
    a latch relay configured to supply a battery power to a vehicle load or to block power to the vehicle load;
    a communication part configured to output a driving signal when a wakeup signal is received from a switch integrated circuit (IC) or a smart key system;
    a processor configured to:
        receive the driving signal; and
        perform a booting operation when the wakeup signal is received;
    a pulse generator configured to:
        receive the driving signal from the communication part; and
        output a one shot pulse to the latch relay while the processor performs the booting operation, wherein the latch relay is configured to operate in a turned-on status based on the one shot pulse; and
    wherein the processor is further configured to:
        control the latch relay to maintain a turned-on status or switch to a turned-off status after the booting operation is completed.

2. The system according to claim 1, wherein when the communication part receives a wakeup signal from the switch integrated circuit (IC) that senses an input a door switch or receive a wakeup signal from a vehicle network through vehicle communication, the communication part is configured to output the driving signal.

3. The system according to claim 1, wherein the communication part is a transceiver configured for vehicle network communication.

4. The system according to claim 1, wherein the pulse generator is a one shot trigger circuit.

5. The system according to claim 1, wherein the processor is configured to confirm an input of the wakeup signal, and to maintain turned on status of the latch relay when the processor confirms the input of the wakeup signal.

6. The system according to claim 1, wherein the processor is configured to confirm an input of the wakeup signal, and to turn off the latch relay when the processor does not confirm the input of the wakeup signal.

7. The system according to claim 1, wherein the system is at least one of a smart junction box, an integrated gateway & power control module (IGPM), or an integrated central control unit (ICU).

8. A method for controlling power of a vehicle by a latch relay that supplies a battery power to a vehicle load or blocks the power, the method comprising:
    receiving, by a processor, a driving signal, wherein the diving signal is generated by a communication part when the communication part receives a wakeup signal from a switch integrated circuit (IC) or a smart key system;
    performing, by a processor, a booting operation when the wakeup signal is received;
    receiving, by a pulse generator, the driving signal from the communication part;
    outputting, by the pulse generator, a one shot pulse to the latch relay while the processor is performing the booting operation;
    operating the latch relay in a turned-on status based on the one shot pulse; and
    controlling, by the processor, the latch relay to maintain a turned-on status or switch to a turned-off status after the booting operation.

9. The method according to claim 8, wherein the controlling of the turning on or the turning off of the latch relay includes:
    when the processor confirms an input of the wakeup signal, maintaining the turned on status of the latch relay; and
    when the processor does not confirms the input of the wakeup signal, turning off the latch relay.

10. The method according to claim 8, wherein the outputting of the one shot pulse includes:
    receiving the wakeup signal from a switch IC that senses an input of a door switch;
    receiving a wakeup request from a vehicle network; and
    when the wakeup signal or the wakeup request is received, outputting the driving signal.

* * * * *